(12) United States Patent
Shimura et al.

(10) Patent No.: US 6,181,506 B1
(45) Date of Patent: *Jan. 30, 2001

(54) TRACKING CONTROL DEVICE

(75) Inventors: Yukio Shimura, Gunma-ken; Shinichi Yamashita; Nobutoshi Takayama, both of Kanagawa-ken, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/504,251

(22) Filed: Jul. 19, 1995

(30) Foreign Application Priority Data

Jul. 26, 1994 (JP) .................................................... 6-174520
Aug. 8, 1994 (JP) .................................................... 6-185651

(51) Int. Cl.[7] .................................................... G11B 5/584

(52) U.S. Cl. ............................................ 360/77.13; 360/51

(58) Field of Search .............................. 360/77.01, 77.12, 360/77.13, 77.14, 53, 61, 51, 73.04

(56) References Cited

U.S. PATENT DOCUMENTS

| | | | |
|---|---|---|---|
| 4,486,796 | * | 12/1984 | Sakamoto ....................... 360/77.13 X |
| 4,688,109 | * | 8/1987 | Sangu ............................. 360/77.16 X |
| 4,977,469 | * | 12/1990 | Yokozawa .......................... 360/77.01 |
| 5,233,487 | * | 8/1993 | Christensen et al. .......... 360/77.03 X |
| 5,287,225 | * | 2/1994 | Sukigara ........................ 360/77.12 X |
| 5,654,843 | * | 8/1997 | Hatanaka ....................... 360/77.13 X |

* cited by examiner

*Primary Examiner*—Andrew L. Sniezek
(74) *Attorney, Agent, or Firm*—Robin, Blecker & Daley (57) ABSTRACT

A novel tracking control device and method is disclosed. In the tracking control device and method, digital information is reproduced from a recording medium by a reproducing head, an error contained in the reproduced digital information is detected, and the relative position between the recording medium and the reproducing head is controlled by using the detection result. In addition, an arrangement capable of realizing a high tracking capability with respect to the non-linearity of a track is also disclosed. The arrangement forms a plurality of tracking error signals indicative of positional deviations between the reproducing head and a plurality of divided areas into which each track formed on the recording medium is divided, and selectively uses the plurality of tracking error signals.

46 Claims, 10 Drawing Sheets

FIG.6(a) SYNCHRONIZING BLOCK
FIG.6(b) ERROR FLAG
FIG.6(c) GATE SIGNAL

TRACKING CONTROL DEVICE

BACKGROUND OF THE INVENTION

1. Field of the Invention

The present invention relates to a tracking control device and, more particularly, to a device for causing a head to trace a track which is formed on a recording medium and on which a digital signal is recorded.

2. Description of the Related Art

Reproduction tracking systems for domestic-use video tape recorders or video cassette recorders fall into two major systems. The first system is called "CTL system". In the CTL system, a fixed magnetic head is provided at a particular location in a tape path. During recording, a predetermined control signal (CTL signal) is recorded on a dedicated track, and, during reproduction, a reproducing head is made to trace a track by using the CTL signal reproduced from the dedicated track. The second system is called "ATF system". In the ATF system, during recording, a plurality of (normally, four) kinds of pilot signals having comparatively low frequencies are recorded simultaneously with a main signal (normally, a video signal) in multiplexed form in such a manner that the frequencies are recurrently repeated from track to track. During reproduction, a tracking error signal (ATF error signal) is obtained by making a comparison between the frequency of the pilot signal reproduced from a track simultaneously with the main signal and the pilot signals reproduced from both adjacent tracks by crosstalk, and a reproducing head is made to trace the track on the basis of the tracking error signal.

In recent years, higher image quality and digitization have been increasingly demanded even in the field of domestic-use video tape recorders, and research and development have been conducted as to formats of narrower track pitch so that more information can be recorded and reproduced. In the case of reproduction from a narrow-pitch track, it is extremely important to increase the accuracy of the longitudinal linearity of the track. For example, in the case of a track of 10-$\mu$m pitch, the linearity must be held at 3 $\mu$m or less. This value is close to the limit of mechanical precision and offers great problems in terms of productivity and cost.

There is also a known art provided with an actuator for displacing a rotary head in a direction which intersects the rotating direction thereof. According to this art, even if a track is curved to some extent, the rotary head can be made to trace the curvature. Although the art is effective in improving tracking performance, it is necessary to use an extremely expensive rotary drum having a very complicated structure.

SUMMARY OF THE INVENTION

It is, therefore, an object of the present invention to solve the above-described problems.

Another object of the present invention is to provide a tracking control device having a high tracking capability with respect to the non-linearity of a track.

To achieve the above-described objects, according to one aspect of the present invention, there is provided a tracking control device which comprises reproducing means for reproducing digital information from a recording medium, detecting means for detecting an error in the reproduced digital information, and tracking control means for controlling a relative position between the recording medium and the reproducing means by using an output of the detecting means.

According to another aspect of the present invention, there is provided a tracking control device which comprises reproducing means for reproducing digital information from a recording medium, forming means for forming a plurality of tracking error signals indicative of positional deviations between the reproducing means and a plurality of divided areas into which each track formed on the recording medium is divided, and tracking control means for controlling a relative position between the recording medium and the reproducing means by selectively using the plurality of tracking error signals.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below in detail with reference to the accompanying drawings.

Figure 1:
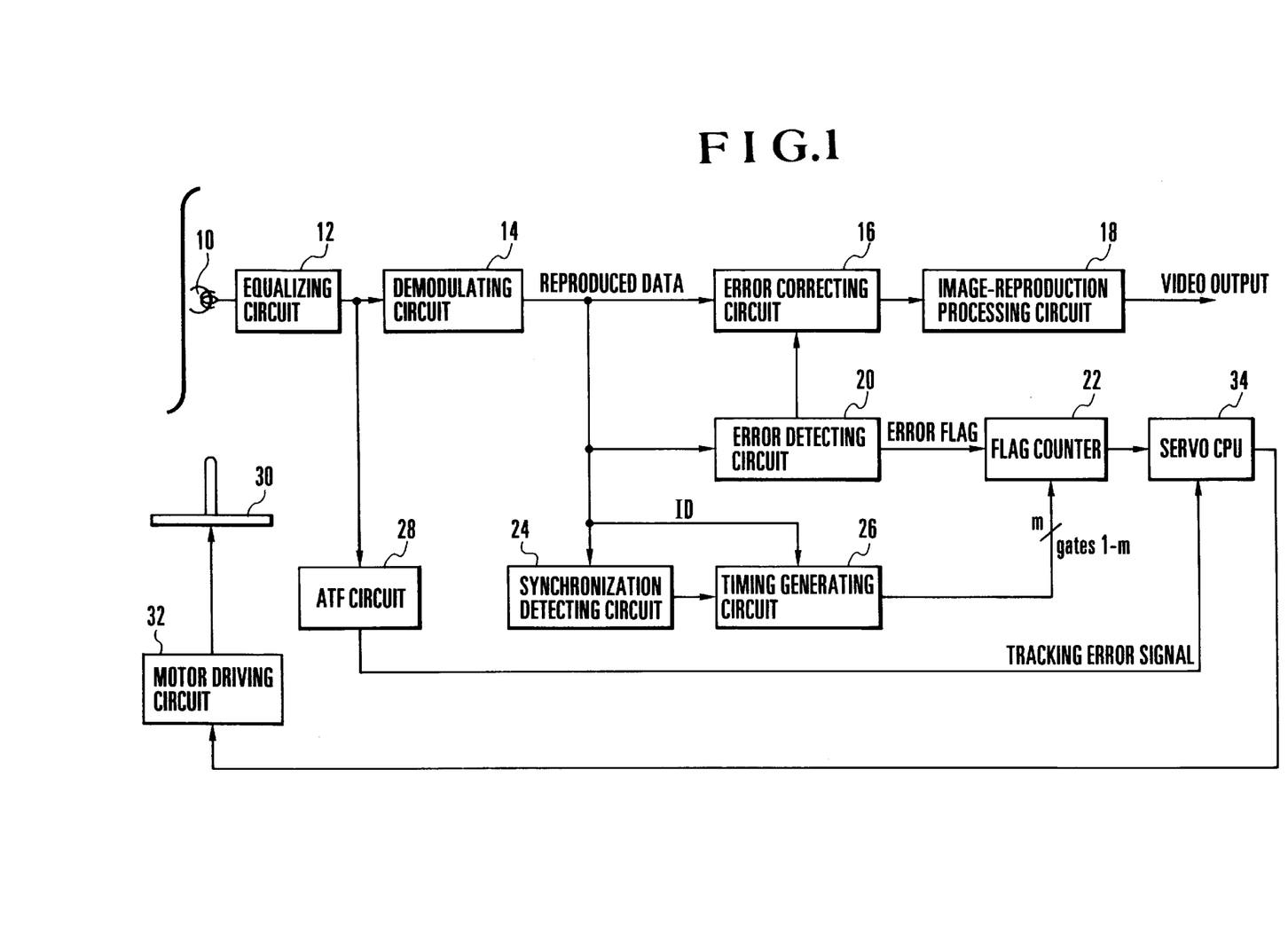
FIG. 1 is a schematic block diagram showing the arrangement of the reproducing system of a digital tape recorder according to a first embodiment of the present invention.

FIG. 1 is a schematic block diagram showing a first embodiment of the present invention which is applied to a digital tape recorder. The shown digital tape recorder includes a reproducing head 10, an equalizing circuit 12 for phase-equalizing the output of the reproducing head 10, a demodulating circuit 14 for digitally demodulating the output (reproduced RF signal) of the equalizing circuit 12, an error correcting circuit 16 for correcting the errors contained in the output data of the demodulating circuit 14, and an image-reproduction processing circuit 18 for generating an image signal from the output data of the error correcting circuit 16.

The shown digital tape recorder includes an error detecting circuit 20 for detecting an error from the output data of the demodulating circuit 14 by parity, and a flag counter 22 for counting error flags outputted from the error detecting circuit 20, for a specified time period. The error detecting circuit 20 also supplies the detected error information to the error correcting circuit 16. The shown digital tape recorder includes a synchronization detecting circuit 24 for detecting from the output data of the demodulating circuit 14 a synchronizing code which occupies the head of a synchronizing block, and a timing generating circuit 26 for decoding the synchronizing-block number of a synchronizing block which is being reproduced, from the synchronization detection signal outputted from the synchronization detecting circuit 24 and the ID data contained in the output data of the demodulating circuit 14, and generating a gate signal for specifying a time period for which to cause the flag counter 22 to perform counting. In the first embodiment, the timing generating circuit 26 generates gate signals for dividing one track into m areas and applies the gate signals to the flag counter 22.

The shown digital tape recorder also includes an ATF circuit 28 for extracting a pilot signal component from the output of the equalizing circuit 12 and outputting a tracking error signal indicative of the amount of tracking error.

The shown digital tape recorder also includes a capstan motor 30 for rotating a capstan which causes video tape to run, a motor driving circuit 32 for driving the capstan motor 30, and a servo CPU 34 for controlling the rotation of the capstan motor 30 via the motor driving circuit 32 in accordance with the respective outputs of the flag counter 22 and the ATF circuit 28.

Figure 2:
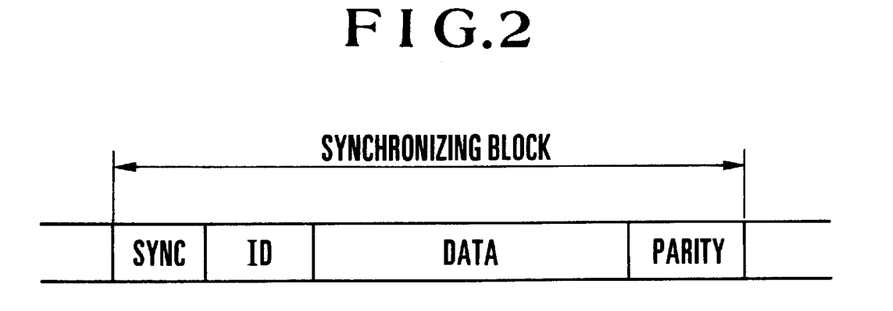
FIG. 2 is a view showing the construction of a synchronizing block in a digital signal reproduced in the digital tape recorder of FIG. 1.

FIG. 2 shows the basic structure of the synchronizing block contained in a reproduced digital signal. The synchronizing block includes a synchronizing code (SYNC) formed in a predetermined pattern, an ID indicative of a number to identify the synchronizing block, data, and parity for error detection.

Figure 3:
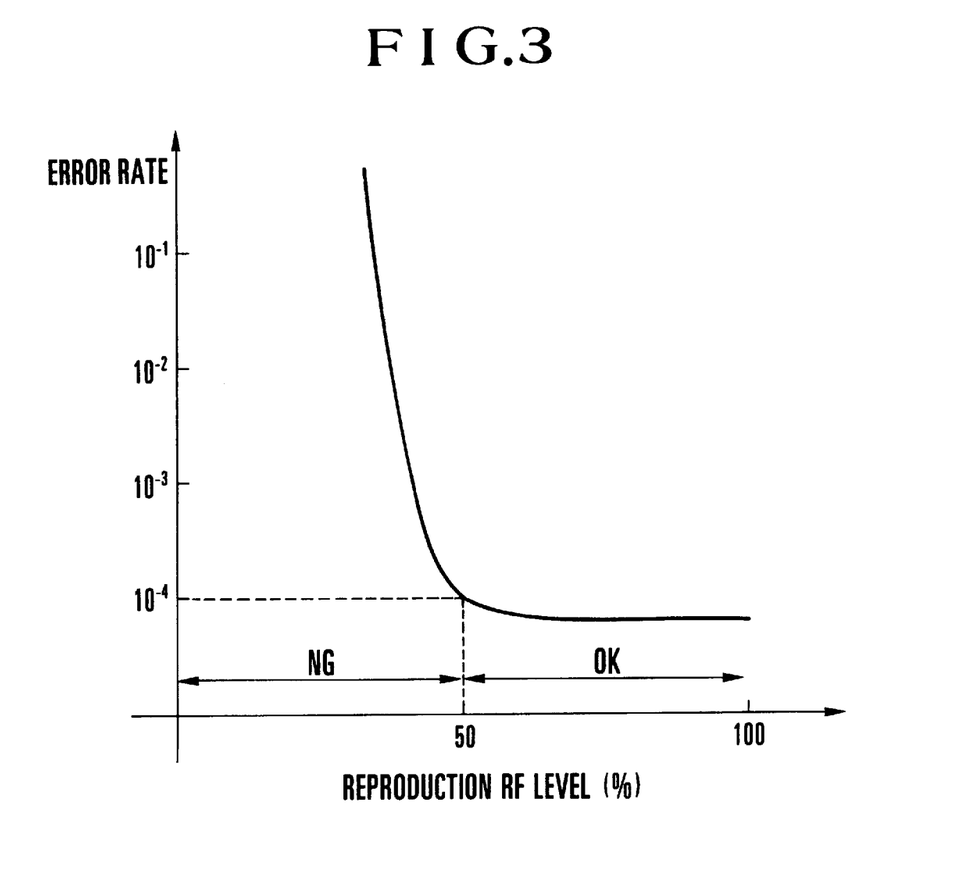
FIG. 3 is a graphic representation showing the relationship between the level of a reproduced RF signal and an error rate.

Prior to describing the operation of the digital tape recorder shown in FIG. 1, the relationship between reproduction RF level and error rate of reproduced data in the case of digital recording will be described below in brief. FIG. 3 shows the relationship between reproduction RF level and error rate. In general, in digital recording/reproduction, if the reproduction RF level is not less than a particular level, the quality of reproduced signals is not substantially influenced. For example, as shown in FIG. 3, if the reproduction RF level is not less than a proper threshold (for example, 50%), the error rate of the reproduced data will show a low value which is a generally tolerable error rate (for example, a threshold Eth of approximately $10^{-4}$). If the reproduction RF level becomes less than the threshold Eth, the error rate increases sharply. In the case of the characteristic shown in FIG. 3, the reproduction RF level may be not less than 50%.

The tracking error signal used in the conventional ATF system is a signal indicative of a mechanical off-track amount. Since tracking control using such signal is average-value control, the accuracy or the capability of the tracking control is not necessarily reflected in an improvement in the quality of reproduced images or a reduction in the number of errors.

Figure 4A:
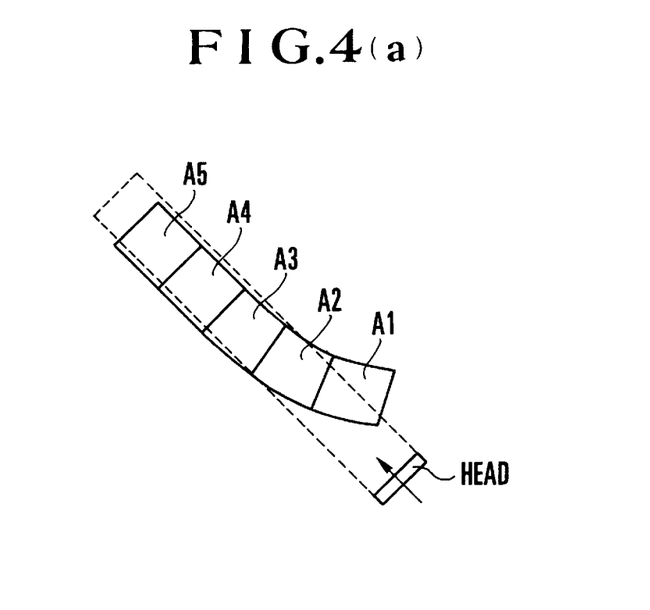
FIGS. 4(a) and 4(b) are views showing the relationship between a trace position of a reproducing head and the level of the reproduced RF signal.
Figure 4B:
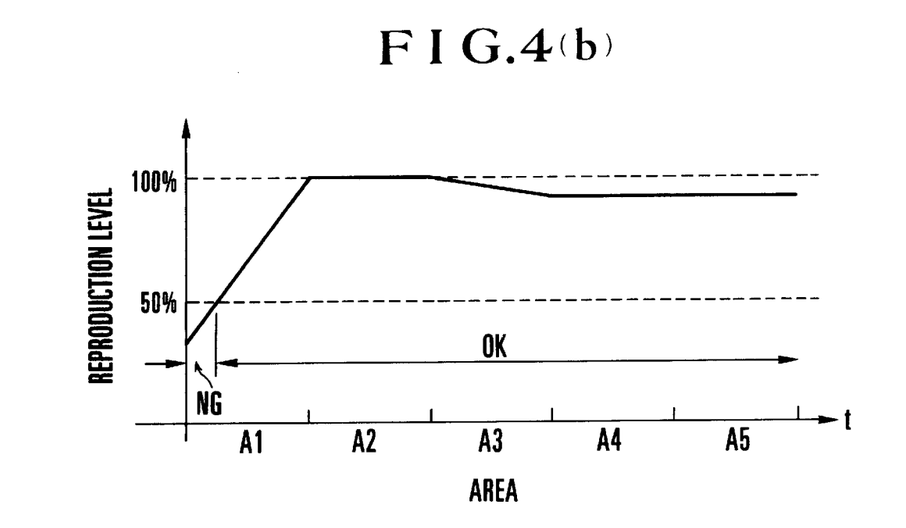
Figure 5A:
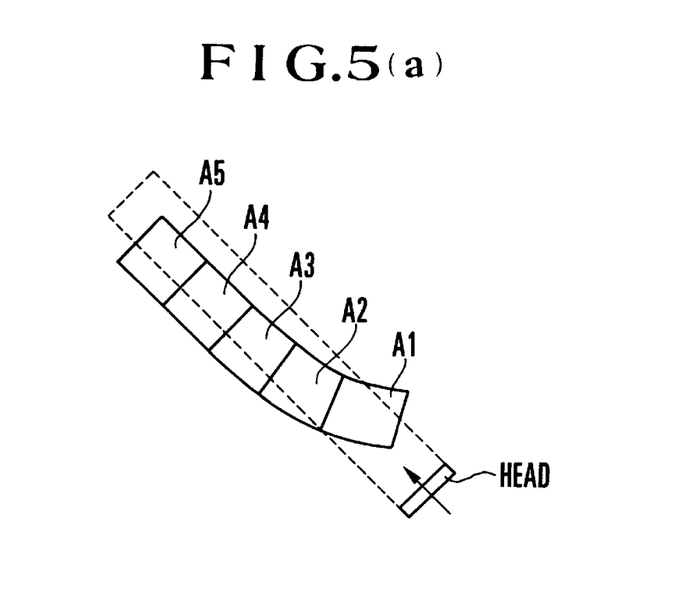
FIGS. 5(a) and 5(b) are views showing the relationship between another trace position of the reproducing head and the level of the reproduced RF signal.
Figure 5B:
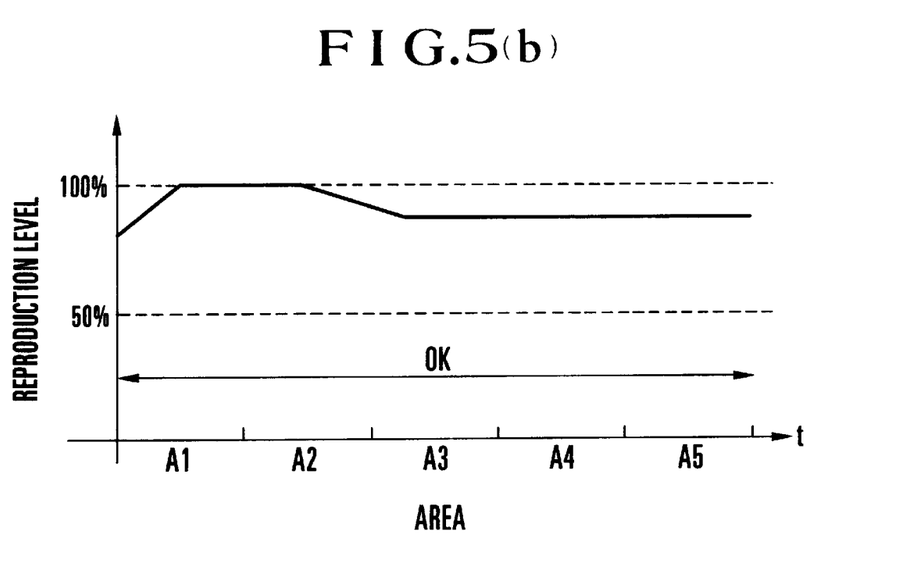

FIGS. 4(a) and 4(b) and FIGS. 5(a) and 5(b) show the relationship between trace locus and reproduction RF level which is produced when a reproducing head traces a track which is bent to a small extent at its start end portion. FIGS. 4(a) and 4(b) show the case in which the reproducing head is off track to a small extent at the start end portion of the track and traces the middle portion thereof in an approximately on-track state. FIGS. 5(a) and 5(b) show the case in which the reproducing head averagely traces the start end and middle portions of the track. FIGS. 4(a) and 5(a) show the trace loci of the reproducing head with respect to the track, and FIGS. 4(b) and 5(b) show the corresponding variations in reproduction RF level with respect to the longitudinal direction of the track.

As shown, the track is divided into a plurality of areas in the longitudinal direction (in this case, five areas A1, A2, A3, A4 and A5), and the reproduction RF level for each of the areas A1 to A5 is detected and examined. In the case shown in FIGS. 4(a) and 4(b), the reproduction RF level is less than 50% while the reproducing head is tracing the start end portion of the track (part of the area A1), but after the reproducing head has passed through the start end portion, the reproduction RF level increases rapidly. Subsequently, the reproduction RF level is maintained at a high level over the areas A2 to A5. In the case shown in FIGS. 5(a) and 5(b), since the reproducing head fully widely traces the area A1 located at the start end of the track, the reproduction RF level exceeds a threshold (50%) even while the reproducing head is tracing the area A1. While the reproducing head is tracing the areas A2, A3, A4 and A5, the reproduction RF level, although low compared to the case of FIGS. 4(a) and 4(b), is maintained at a level which is sufficiently high as viewed from the error rate.

As can be seen from FIGS. 4(a), 4(b) and FIGS. 5(a), 5(b), it is preferable to control tracking so that the reproduction RF level can be maintained at not less than a predetermined level over the entire track, instead of simply decreasing the off-track amount of the reproducing head. In light of this point, the first embodiment is arranged to refer to the error rates of reproduced data, particularly the longitudinal distribution of the error rates over the entire track, and control the tracking of the reproducing head so that the distributed error rates can decrease over the entire track. Incidentally, since the error rate depends on not only the reproduction RF level but also reproduction frequency characteristics and phase characteristics, a minimum level at which the reproduction RF level is to be maintained is determined while taking account of the reproduction frequency characteristics and the phase characteristics as well.

The operation of the digital tape recorder will be described below in detail. The reproducing head 10 performs electromagnetic conversion of a signal recorded on magnetic tape, and applies the resultant signal to the equalizing circuit 12. The equalizing circuit 12 compensates for an interference between codes which occurs during a magnetic recording/reproduction process, and the demodulating circuit 14 digitally demodulates the output of the equalizing circuit 12. Specifically, the demodulating circuit 14 extracts clock components and restores a digital data stream in accordance with the extracted clocks. The output of the demodulating circuit 14 is applied to the error correcting circuit 16, the error detecting circuit 20, the synchronization detecting circuit 24 and the timing generating circuit 26.

The error detecting circuit 20 detects an error from the data part of a synchronizing block through the parity thereof, and applies error-position information relative to the detected error to the error correcting circuit 16 and an error flag to the flag counter 22. The error correcting circuit 16 corrects the error contained in the data part in accordance with the error-position information supplied from the error detecting circuit 20, and supplies the error-corrected data to the image-reproduction processing circuit 18. The image-reproduction processing circuit 18 performs image-reproduction processing of the error-corrected data supplied from the error correcting circuit 16 and outputs the image signal thus reproduced.

Figure 6A:
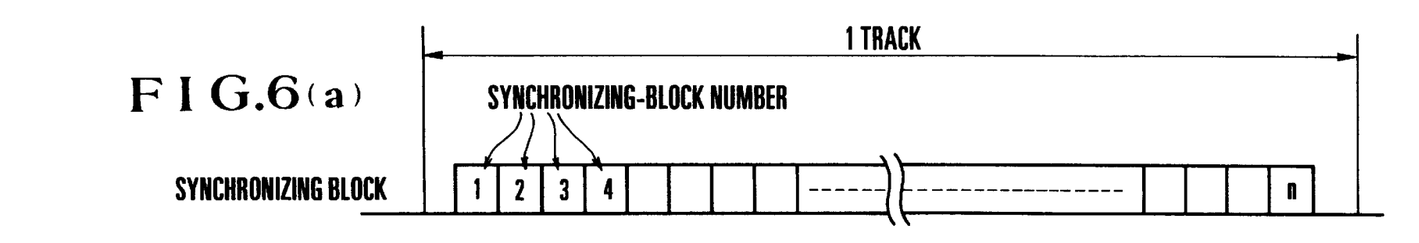
FIGS. 6(a), 6(b) and 6(c) are timing charts showing the relationship between each synchronizing block and each gate signal of FIG. 1.
Figure 6B:
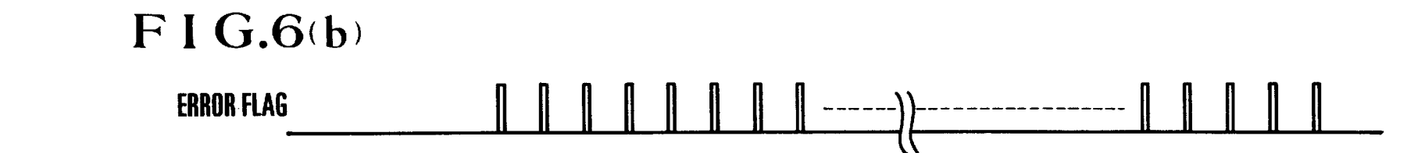
Figure 6C:
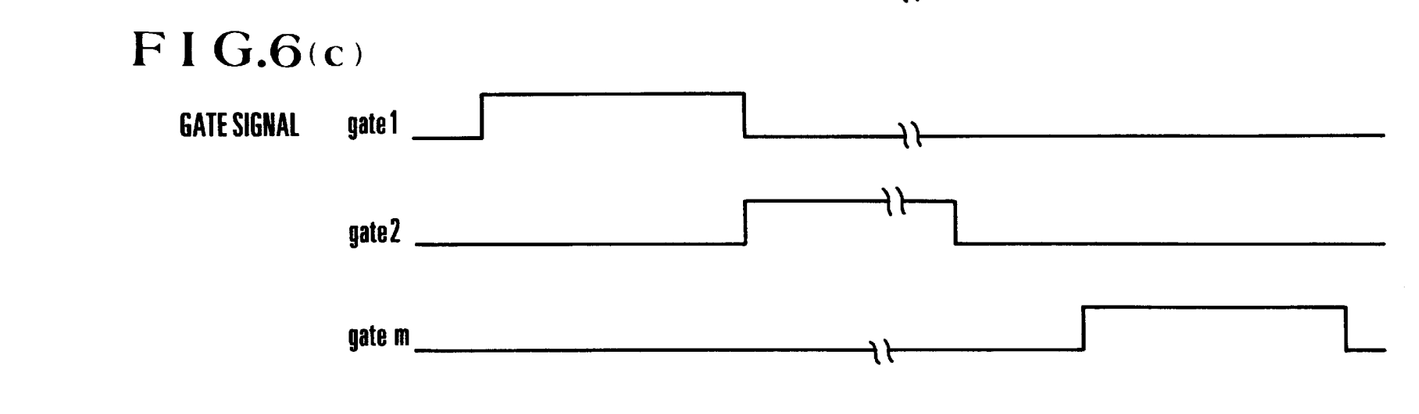

The synchronization detecting circuit 24 detects the synchronizing code of the synchronizing block shown in FIG. 2, from the output of the demodulating circuit 14, and applies the resultant synchronization detection signal to the timing generating circuit 26. The timing generating circuit 26 extracts the ID of the synchronizing block from the output data stream of the demodulating circuit 14 in accordance with the synchronization detection signal supplied from the synchronization detecting circuit 24, decodes the number of the synchronizing block, and generates a gate signal for application to the flag counter 22. FIGS. 6(a), 6(b) and 6(c) show the timing of error flags and gate signals with respect to n synchronizing blocks which are contained in one track. FIG. 6(a) shows a synchronizing-block string, FIG. 6(b) shows the error flags to be applied from the error detecting circuit 20 to the flag counter 22, and FIG. 6(c) shows gate signals gate 1 to gate m to be supplied to the flag counter 22 by the timing generating circuit 26.

The flag counter 22, which will be described later in detail, counts the number of error flags for each of m areas into which one track is divided in the longitudinal direction in accordance with the gate signals gate 1 to gate m supplied from the timing generating circuit 26. The count number of error flags substantially represents the random error rate of errors occurring in a reproduced data string, i.e., the number of error flags occurring within a constant time period is substantially proportional to the random error rate. The m count values provided by the flag counter 22 are applied to the servo CPU 34.

The ATF circuit 28 extracts a pilot signal component from the output of the equalizing circuit 12 and outputs to the servo CPU 34 a tracking error signal indicative of an off-track amount. The servo CPU 34 stores the tracking error signal supplied from the ATF circuit 28, i.e., the off-track amount, for at least each of the m areas divided in accordance with the gate signals gate 1 to gate m generated by the timing generating circuit 26.

The servo CPU 34 searches for an area which contains a maximum number of errors, from the output (error distribution) of the flag counter 22, and generates a tracking control signal for the motor driving circuit 32 from the off-track amount (tracking error signal) detected in the area by the ATF circuit 28. Thus, the rotation of the capstan motor 30 is controlled so that the off-track amount for the area which contains the maximum number of errors can be made a predetermined value (a zero or non-zero value).

Figure 7:
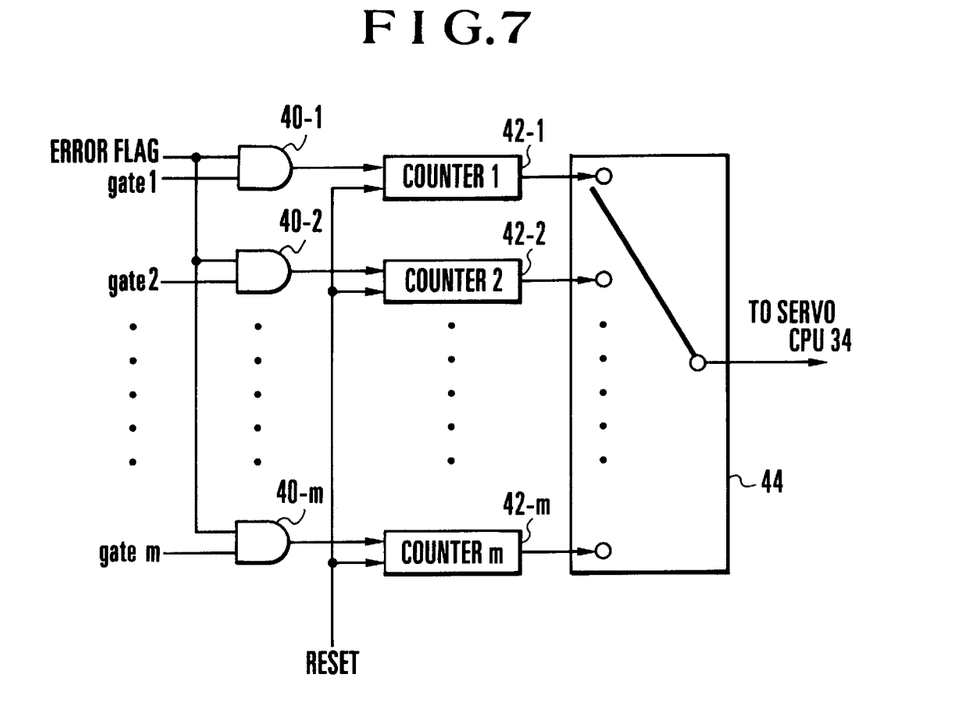
FIG. 7 is a schematic view showing the specific construction of the flag counter shown in FIG. 1.

FIG. 7 shows an example of the internal circuit of the flag counter 22. The flag counter 22 includes AND gates 40-1, 40-2, . . . , 40-m which are respectively gate-controlled by the gate signals gate 1 to gate m to selectively pass an error flag, counters 42-1, 42-2, . . . , 42-m for counting the error flags outputted from the respective AND gates 40-1, 40-2, . . . , 40-m, and a switch 44 for sequentially selecting each of the count values of the counters 42-1, 42-2, . . . , 42-m and supplying them to the servo CPU 34 in that order.

Figure 8:
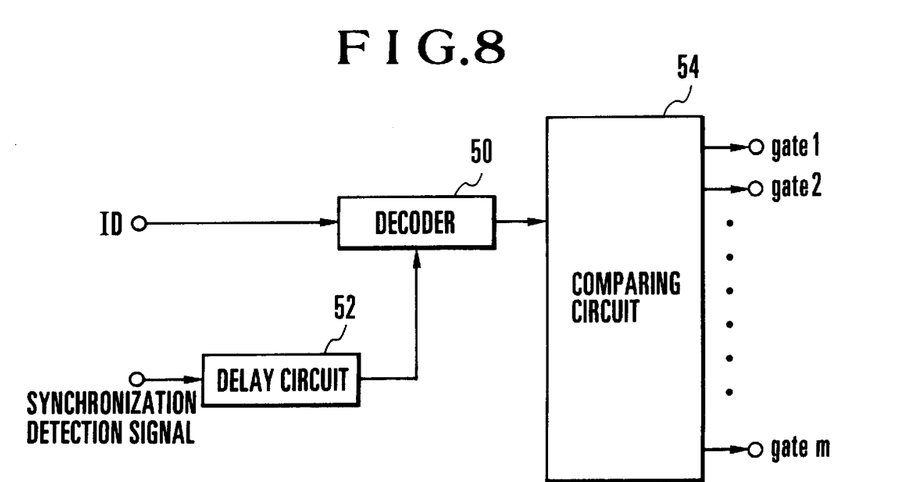
FIG. 8 is a schematic view showing the specific construction of the timing generating circuit shown in FIG. 1.

FIG. 8 shows an example of the internal circuit of the timing generating circuit 26. The ID data is applied to a decoder 50, while the synchronization detection signal supplied from the synchronization detecting circuit 24 is applied to a delay circuit 52. The delay circuit 52 delays the synchronization detection signal by a time period which elapses until the timing at which the decoder 50 finishes latching the synchronizing-block number data contained in the ID part of the synchronizing block, and applies the delayed synchronization detection signal to the decoder 50. The decoder 50 reads and decodes the synchronizing-block number of the ID data in accordance with the delayed synchronization detection signal supplied from the delay circuit 52. The decoder 50 supplies the decoded synchronizing-block number to a comparing circuit 54. The comparing circuit 54 compares the synchronizing-block number supplied from the decoder 50 with predetermined values for dividing one track into m areas in the longitudinal direction, and sets the required one of m output lines to its H (high) level and the other output lines to their L (low) levels.

Accordingly, since weighted control is performed for all areas or a particularly important area or areas of each track on the basis of error-for-each-area information and tracking error information, it is possible to realize optimum control which is suited to the mode of operation of the VTR.

In the first embodiment, the function of the servo CPU 34 is realized by software. Although in the first embodiment the rotation of a capstan is controlled by using a tracking error signal generated from a pilot signal extracted from an area which contains the largest number of errors in one track, it is, of course, possible to more finely control the rotation of the capstan by using a more complicated algorithm. For example, if a particular area in one track contains an extremely large number of errors, a tracking error signal obtained from an area which contains the second largest number of errors in the track may also be used for tracking control. Thus, it is possible to prevent tracking from being controlled in an erroneous direction by dropout or burst error.

The first embodiment has been described above on the assumption that a single track is optimally traced. However, in practice, since continuous tracks curve in the same shape, tracking relative to each of the continuous tracks may be controlled by using a tracking error signal determined by the number of errors for each area during tape running. The number of errors for each area is monitored at proper timings or at all times to determine an area from which to obtain the tracking error signal for use in the tracking control.

The art of controlling the tracking of a reproducing head on the basis of the number of errors (or error rate) per area can be applied to not only magnetic tape for helical-scan recording but also disk-shaped recording media (such as optical disks, magnetooptical disks, floppy disks or hard disks) or various other media.

As can be readily understood from the above description, according to the above-described first embodiment, the tracking control of a digital recording system is optimized to a further extent to reduce the overall error rate, whereby the quality of reproduced signals can be improved. It is possible to realize tracking correction which can cope with, particularly, a deviation of the linearity of tracks.

If the first embodiment is applied to a video tape recorder, it is possible to optimize tracking by specifying an arbitrary area in a track according to the mode of reproduction operation.

A second embodiment of the present invention will be described below in detail.

Figure 9:
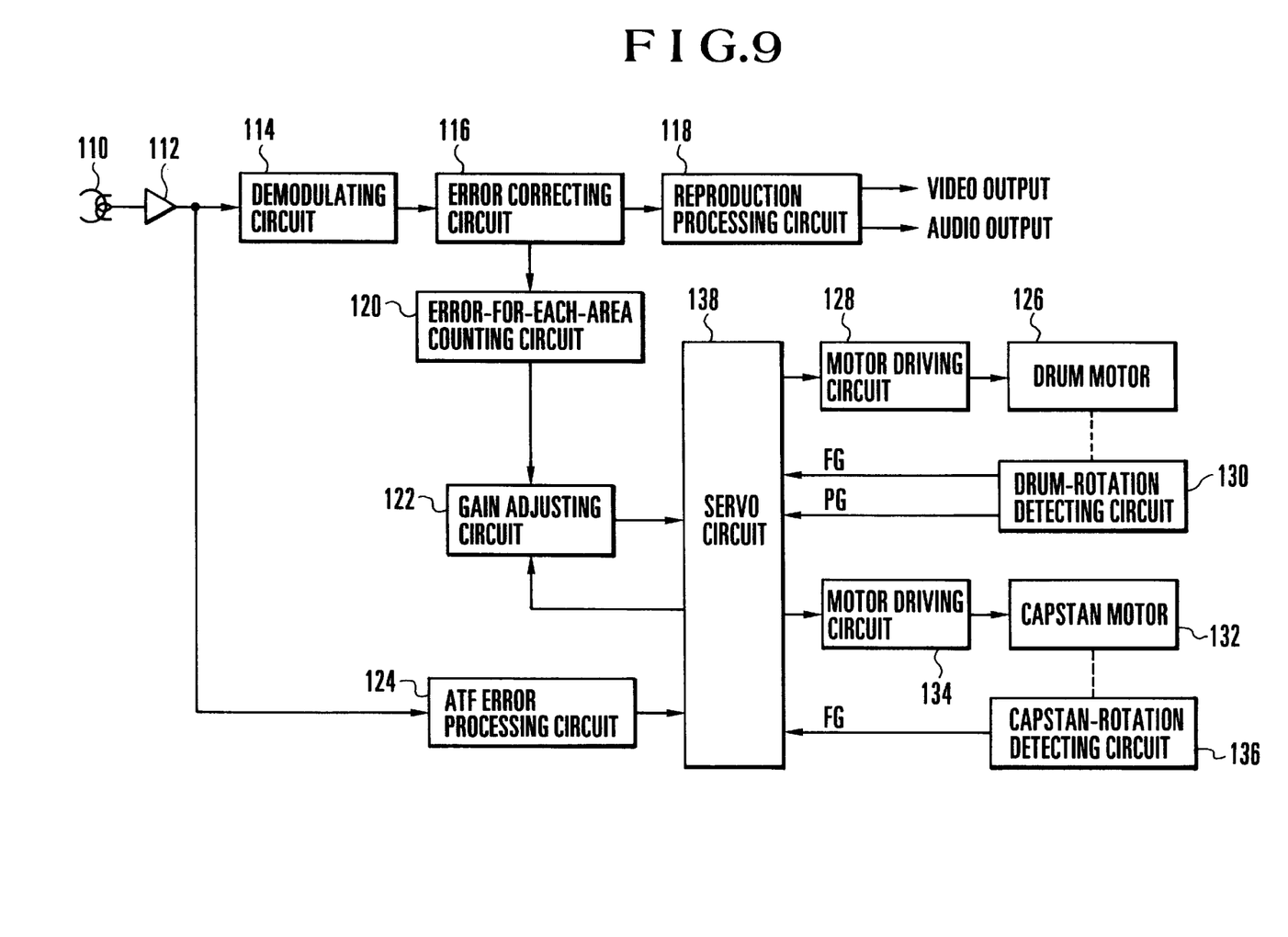
FIG. 9 is a schematic block diagram showing the arrangement of the reproducing system of a digital tape recorder according to a second embodiment of the present invention.

FIG. 9 is a schematic block diagram showing the second embodiment of the present invention which is applied to a digital tape recorder. The shown digital tape recorder includes a reproducing head 110, a reproduction amplifier 112 for amplifying the output of the reproducing head 110, a demodulating circuit 114 for digitally demodulating the output (reproduced RF signal) of the reproduction amplifier 112, an error correcting circuit 116 for detecting and correcting an error contained in the output data of the demodulating circuit 114, and a reproduction processing circuit 118 for performing reproduction processing on the output data of the error correcting circuit 116 (time-base separation between video data and audio data, expansion of compressed data and conversion into analog form) and outputting a reproduced video signal and a reproduced audio signal.

The shown digital tape recorder also includes an error-for-each-area counting circuit 120 for counting the number of errors detected by the error correcting circuit 116, for each of a plurality of areas into which one track is divided in the longitudinal direction, and a gain adjusting circuit 122 for performing specified weighting on the count result provided by the error-for-each-area counting circuit 120.

The shown digital tape recorder also includes an ATF error processing circuit 124 for extracting a pilot signal component from the output of the reproduction amplifier 112 and outputting a tracking error signal indicative of the amount of tracking error.

The shown digital tape recorder also includes a drum motor 126 for rotating a rotary drum (not shown), a motor driving circuit 128 for driving the drum motor 126, a drum-rotation detecting circuit 130 for detecting the rotation of the drum motor 126 and outputting a PG signal indicative of the rotational phase of the drum motor 126 and an FG signal indicative of the rotational speed of the drum motor 126, a capstan motor 132 for rotating a capstan (not shown) which causes video tape to run, a motor driving circuit 134 for driving the capstan motor 132, and a capstan-rotation detecting circuit 136 for detecting the rotation of the capstan motor 132 and outputting an FG signal indicative of the rotational speed of the capstan motor 132.

The shown digital tape recorder also includes a servo circuit 138 for controlling the rotational speed and phase of the drum motor 126 via the motor driving circuit 128 and the rotational speed of the capstan motor 132 via the motor driving circuit 134 in accordance with the respective outputs of the gain adjusting circuit 122, the ATF error processing circuit 124, the drum-rotation detecting circuit 130 and the capstan-rotation detecting circuit 136. The servo circuit 138 also controls the gain (the amount of weighting) of the gain adjusting circuit 122. The servo circuit 138, which will be described later in detail, is in practice realize by a microcomputer.

The operation of the digital tape recorder shown in FIG. 9 will be described below in detail. The output of the reproducing head 110 is amplified to a predetermined level by the reproduction amplifier 112, and the output of the reproduction amplifier 112 is applied to the demodulating circuit 114 and the ATF error processing circuit 124. The demodulating circuit 114 demodulates the output of the reproduction amplifier 112, and the error correcting circuit 116 detects an error from the output of the demodulating circuit 114 and corrects the error within the range of its correction capability. The error correcting circuit 116 outputs the error-corrected data to the reproduction processing circuit 118 and an error detection signal (for example, a pulse signal in which one pulse appears each time an error is detected) to the error-for-each-area counting circuit 120. The reproduction processing circuit 118 performs time-base separation, expansion and D/A conversion on the reproduced data supplied from the error correcting circuit 116 and outputs a reproduced video signal and a reproduced audio signal.

The error-for-each-area counting circuit 120 counts the number of errors for each area (for examples, each of the areas A1, A2, A3, ... shown in FIGS. 4(a), 4(b) and FIGS. 5(a), 5(b)) into which one track is divided in the longitudinal direction, on the basis of the error detection signal supplied from the error correcting circuit 116. The error-for-each-area counting circuit 120 outputs the obtained information indicative of the number of errors for each area to the gain adjusting circuit 122. The gain of the gain adjusting circuit 122 is controlled by the servo circuit 138, and the gain adjusting circuit 122 weights with a specified gain the number of errors for each area supplied from the error-for-each-area counting circuit 120 and supplies the resultant information to the servo circuit 138.

In the meantime, the ATF error processing circuit 124 extracts a pilot signal component from the output of the reproduction amplifier 112 and outputs a tracking error signal indicative of an off-track amount to the servo circuit 138.

The servo circuit 138 is also supplied with a signal indicative of the rotational speed and phase of the drum motor 126, i.e., the rotary drum, by the drum-rotation detecting circuit 130, and with information relative to the rotational speed of the capstan motor 132, i.e., the speed of tape running, by the capstan-rotation detecting circuit 136. The servo circuit 138 controls the rotation of the drum motor 126 via the motor driving circuit 128 and the rotation of the capstan motor 132 via the motor driving circuit 134, so as to bring both rotations into predetermined states.

Figure 10A:
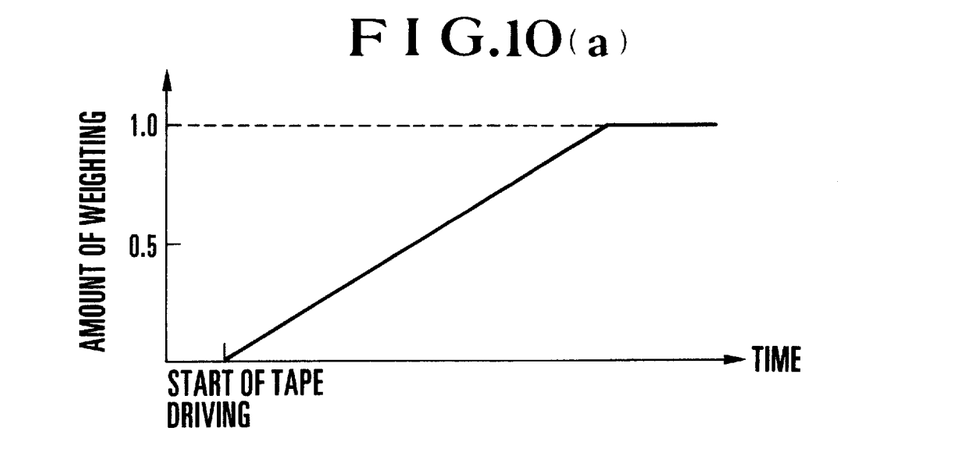
FIGS. 10(a), 10(b) and 10(c) are characteristic charts of weighting performed by the gain adjusting circuit shown in FIG. 9.
Figure 10B:
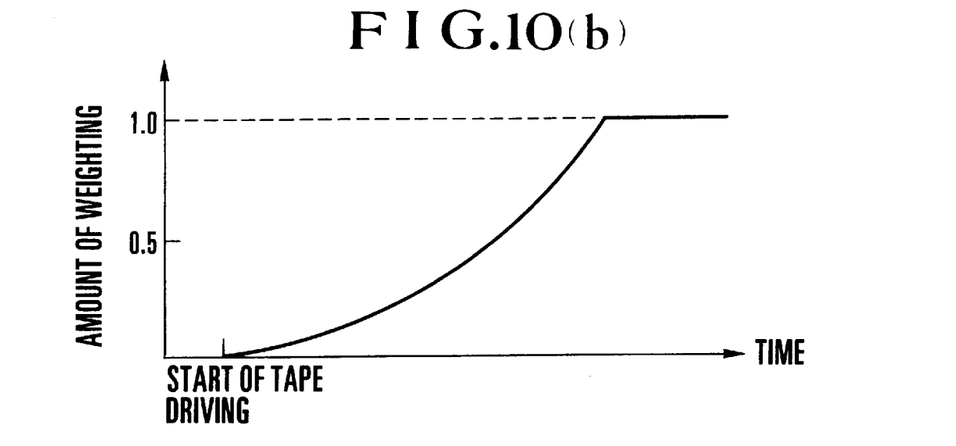
Figure 10C:
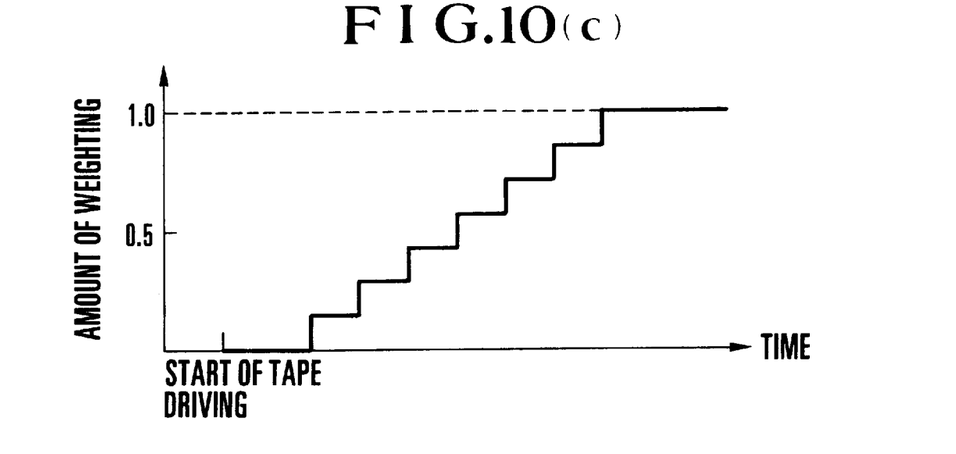

For the purpose of tracking, the servo circuit 138 further controls the rotation of the capstan motor 132 in the following manner in accordance with the tracking error signal supplied from the ATF error processing circuit 124 and the weighted number of errors for each area supplied from the gain adjusting circuit 122. FIGS. 10(a) to 10(c) show the characteristics of weighting by the gain adjusting circuit 122. In the second embodiment, the gain of the gain adjusting circuit 122, i.e., the amount of weighting of the number of errors for each area, is made zero immediately after the start of tape driving, and is subsequently made larger with the passage of time. FIG. 10(a) shows an example in which the amount of weighting, i.e., the gain, is made to increase linearly with the passage of time. FIG. 10(b) shows an example in which the amount of weighting, i.e., the gain, is made to increase non-linearly (for example, exponential function, power exponent or geometric series) with the passage of time. FIG. 10(c) shows an example in which the amount of weighting, i.e., the gain, is made to increase step by step with the passage of time. In each of FIGS. 10(a) to 10(c), the horizontal axis represents time and the vertical axis represents the amount of weighting of the number of errors for each area. In any of the examples, the amount of weighting is 0–0.1, and is made constant at 1.0 after the passage of a predetermined time period.

The servo circuit 138 corrects a reference value of the tracking error signal in accordance with the thus-weighted number of errors for each area, and controls the rotation of the capstan motor 132 so that the tracking error signal can coincide with the corrected reference value. Specifically, the servo circuit 138, which generally controls the rotation of the capstan motor 132 so that the tracking error signal can be made equal to the reference value (for example, 2.5V), shifts the reference value to, for example, 2V or 3V in accordance with the weighted number of errors for each area, thereby causing the reproducing head to move off track by a proper amount according to the number of errors for each area.

For example, assuming that the reproducing head is made to move off track by ½ of a track width for 100 errors, if the number of errors is 50, the reproducing head is made to move off track by ¼ of the track width. The amount of weighting=0 indicates that tracking control based on only the tracking error signal may be executed irrespective of the number of errors and the off-track amount is 0. If the number of errors is 100 and the amount of weighting is 0.5, the reproducing head is made to move off track by ¼ of the track width, and if the amount of weighting is 1.0, the reproducing head is made to move off track by ½ of the track width.

Figure 11:
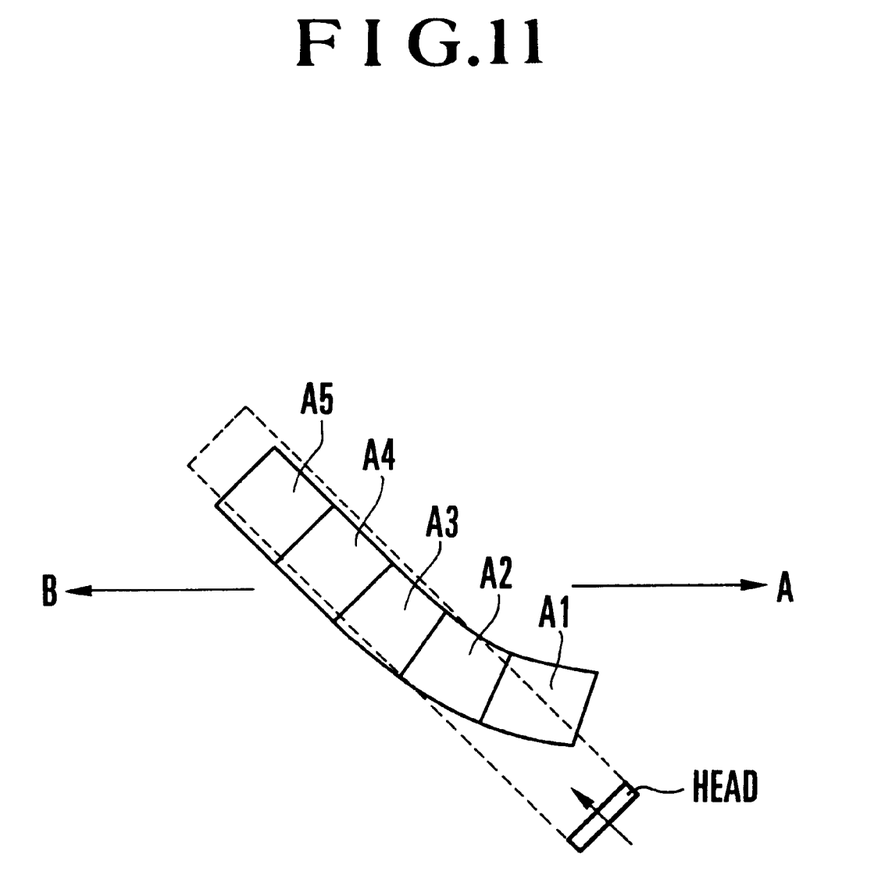
FIG. 11 is a view aiding in explaining the operation of the embodiment of FIG. 9, and shows the relationship between the trace locus of a head and a track.
Figures 12A, 12B:
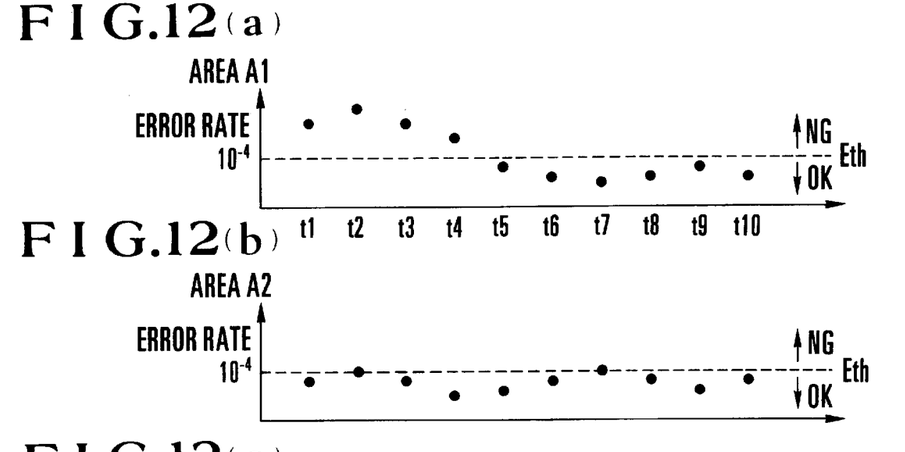
FIGS. 12(a) to 12(f) are views showing variations in error rate and off-track amount during tracing of the head shown in FIG. 11.
Figure 12C:
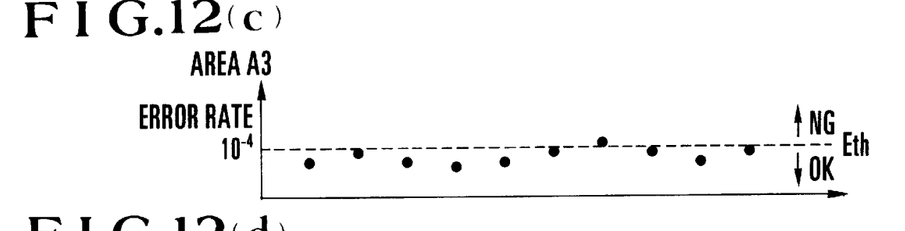
Figure 12D:
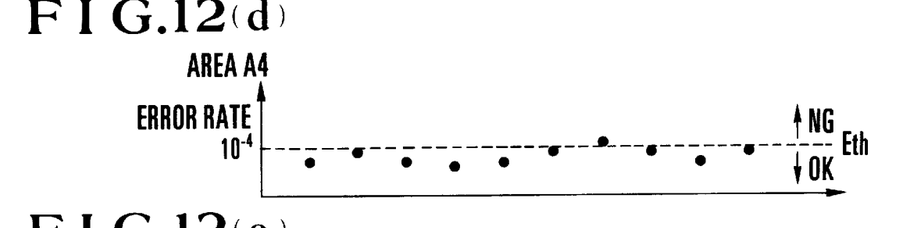
Figure 12E:
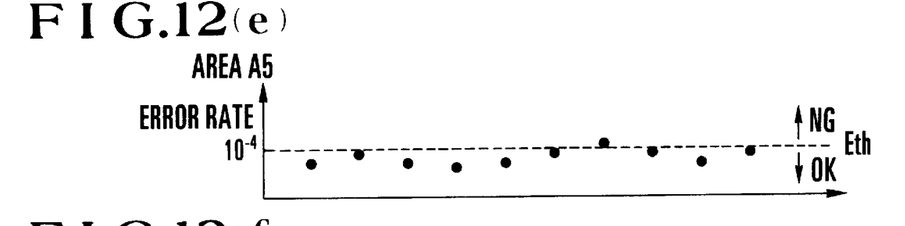
Figure 12F:
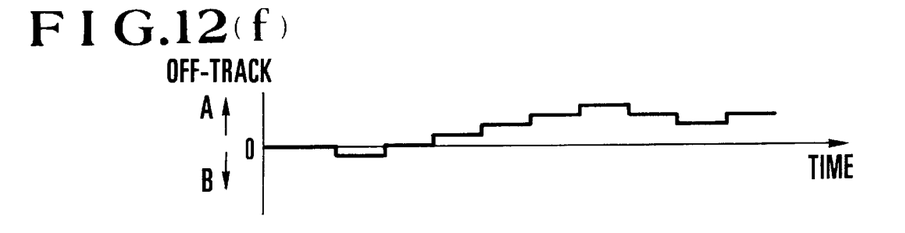

The details of the tracking control based on the number of errors for each area according to the second embodiment will be described below with reference to FIG. 11 and FIGS. 12(a) to 12(f). FIG. 11 is a view aiding in describing the tracking control and shows the shape of a track and directions A and B in which the reproducing head can move off track. FIGS. 12(a) to 12(f) show the respective error rates for the areas A1, A2, A3, A4 and A5 of the track and the off-track amount at each step of the tracking control. In each of FIGS. 12(a) to 12(f), the horizontal axis represents time, and the vertical axis of each of FIGS. 12(a) to 12(e) represents the error rate for each area, while the Vertical axis of FIG. 12(f) represents the off-track amount. The following description assumes that the threshold Eth is $10^{-4}$.

As describe previously with reference to FIGS. 10(a) to 10(c), immediately after the start of tape driving, the amount of weighting of the number of errors for each area is 0 or an extremely small value and tracking is controlled on the basis of only the tracking error signal outputted from the ATF error processing circuit 124. For the convenience of explanation, it is assumed that while the reproducing head is tracing one track, the gain of the gain adjusting circuit 122 is constant. In the example shown in FIG. 11 and FIGS. 12(a) to 12(f), at the first trace t1, the error rate for the area A1 is greater than the threshold Eth, whereas the error rates for the other areas A2, A3, A4 and A5 are less than the threshold Eth. Accordingly, the servo circuit 138 causes the reproducing head 110 to move off track by a predetermined amount in the direction A or B (in FIG. 12(f), in the direction B) with respect to a target track. In which direction A or B to first move the reproducing head 110 is normally determined by the tracking error signal (or initial setting).

As the result of the movement in the direction B, the error rate for the area A2 deteriorates at the second trace t2. Although the error rates for the other areas A2, A3, A4 and A5 also deteriorate, they are still not greater than the threshold Eth. Since the error rate for the area A1 is greater than the threshold Eth but deteriorates with respect to the previous trace t1, the direction in which to cause the reproducing head to move off track is reversed and the reproducing head is subsequently made to move off track in the direction A. At the third trace t3, all the error rates become equal to those at the first trace t1. When the reproducing head is made to move stepwise to a further extent in the direction A and the fourth trace t4 is executed, the error rate for the area A1 remains greater than the threshold Eth, but becomes lower than that for the previous third trace Ti. The error rates for the other areas A2, A3, A4 and A5 remain less than the threshold Eth.

When the reproducing head moves stepwise to a further extent and the fifth trace t5 is executed, the error rate for the area A1 becomes less than the threshold Eth and the error rates for the other areas A2, A3, A4 and A5 remain less than the threshold Eth. To obtain an optimum trace position at which the error rate for each area can be made lower, the reproducing head is made to move stepwise to a further extent in the direction A. At the sixth trace t6, compared with the previous fifth trace t5, the error rate for the area A1 becomes low, while the other areas A2, A3, A4 and A5 become high but are still not greater than the threshold Eth.

When the reproducing head moves stepwise to a further extent in the direction A and the trace t7 is executed, the error rate for the area A1 becomes low compared with the previous trace t6 and the error rates for the other areas A2, A3, A4 and A5 becomes not less than the threshold Eth.

From the above-described process, it is found out that the optimum trace position is the trace t5 or t6. The servo circuit 138 then causes the reproducing head 110 to move off track in the direction B, thereby controlling the trace of the reproducing head 110 to make it coincident with a trace position equivalent to the trace t5 or t6.

In the above-described manner, according to the second embodiment, the reproducing head is made to move off track so that the error rate for each area can be made low as a whole. If a reproduction track is partly curved as shown in FIG. 11, the error rate for one or a plurality of areas will deteriorate. In this case, after continuous areas which show error rates greater than the threshold Eth have been found, the reproducing head may be made to move off track so that the error rates for the continuous areas can be made not greater than the threshold Eth. However, for example if a reproduction track is formed in a zigzag, the error rates for a plurality of remote areas deteriorate. In this situation, the variations of the error rates for the respective areas with respect to off-track positions are statistically processed to determine an optimum off-track position.

The second embodiment has been described above on the assumption that a single track is optimally traced. However, in practice, since continuous tracks curve in the same shape, tracking relative to each of the continuous tracks may be controlled according to the number of errors for each area during tape running, as described previously with reference to FIGS. 12(a) to 12(f).

Although in the second embodiment an off-track position is determined by using the number of errors (or error rates) for each of five areas which are formed in a start portion of a track, it is apparent that the technical scope of the present invention encompasses the art of performing tracking control by using the number of errors (or error rate) for each area of the entire track or the numbers of errors (or error rates) for a plurality of selected areas of the entire track.

According to the above-described second embodiment, at the start of tape driving, it is possible to control the reproducing head to cause it to move to an optimum position in a shorter time than the conventional art.

The art of controlling the tracking of a reproducing head on the basis of the number of errors (or error rate) per area can be applied to not only magnetic tape for helical-scan recording but also disk-shaped recording media (such as optical disks, magnetooptical disks, floppy disks or hard disks) or various other media.

As can be readily understood from the above description, according to the above-described second embodiment, the tracking control of a digital recording system is optimized to a further extent to reduce the overall error rate, whereby the quality of reproduced signals can be improved.

What is claimed is:

1. A reproducing device comprising:
   reproducing means for reproducing digital information from a recording medium on which a plurality of tracks are formed, each track having a plurality of areas along the longitudinal direction of the track;
   detection means for detecting an error in the reproduced digital information reproduced from the plurality of tracks, said detection means detecting the error of each of the plurality of areas of the track; and
   tracking control means for selecting one area from the plurality of areas of the track based on the error for each area detected by said detection means and for controlling a relative position between a target track of the recording medium and said reproducing means according to the selection result.

2. A device according to claim 1, wherein said tracking control means includes counting means for counting the number of errors detected by said detection means.

3. A device according to claim 2, wherein said tracking control means controls the relative position between the recording medium and said reproducing means so as to decrease a count value to be outputted from said counting means.

4. A device according to claim 3, wherein said tracking control means includes means for forming a tracking error signal indicative of a positional deviation between a track on the recording medium and said reproducing means by using a signal reproduced by said reproducing means, and controls the relative position between the recording medium and said reproducing means by using both a first control signal obtained on the basis of the count value and a second control signal obtained on the basis of the tracking error signal.

5. A device according to claim 4, wherein said tracking control means includes adding means for performing weighting and addition of the first control signal and the second control signal.

6. A device according to claim 5, wherein said tracking control means varies the weighing to be performed by said adding means, according to a time period which starts after said reproducing means starts reproducing the digital information.

7. A device according to claim 5, wherein said tracking control means gradually increases a weight of the second control signal according to a time period which starts after said reproducing means starts reproducing the digital information.

8. A device according to claim 2, wherein said counting means counts the number of the errors for each area of the track and outputs a plurality of count result.

9. A device according to claim 8, wherein said tracking control means controls the relative position between the target track and said reproducing means so as to decrease any one of the plurality of count result.

10. A device according to claim 8, wherein said tracking control means determines whether the plurality of count results are not greater than a predetermined threshold value.

11. A device according to claim 8, wherein each area of the track corresponds in number to an integer multiple of a synchronizing block of the reproduced digital information.

12. A device according to claim 1, wherein the recording medium is a magnetic tape having oblique tracks.

13. A device according to claim 1, wherein said tracking control means includes forming means for forming a tracking error signal indicative of a positional deviation between said at least one track on the recording medium and said reproducing means, and controls processing by said forming means according to the output of said detecting means.

14. A device according to claim 13, wherein said forming means forms a plurality of tracking error signals indicative of positional deviations between said reproducing means and the plurality of areas of the track, said tracking control means determining one tracking control signal from the plurality of tracking control signals according to the selection result and controlling the relative position between said reproducing means and the recording medium according to the determined one tracking error signal.

15. A device according to claim 14, wherein said tracking control means includes a plurality of counting means each for counting the number of errors detected by said detection means for each areas, and selects the one area from the plurality of areas of the track based on count results of said plurality of counting means.

16. A device according to claim 15, wherein said tracking control means controls the relative position between said reproducing means and the recording medium by using the determined tracking error signal obtained from the one area which corresponds to a maximum one of the count results of said plurality of counting means.

17. A reproducing device comprising:
    reproducing means for reproducing digital information from a recording medium on which a plurality of tracks are formed, each track having a plurality of areas which are along the longitudinal direction of the track;
    forming means for forming a plurality of tracking error signals indicative of positional deviations between said reproducing means and the plurality of areas of the track; and
    tracking control means for controlling a relative position between a target track of the recording medium and said reproducing means by selectively using the plurality of tracking error signals formed by said forming means.

18. A device according to claim 17, further comprising detecting means for detecting an error in the reproduced digital information,
    wherein said tracking control means includes a plurality of counting means for counting the number of errors detected by said detecting means for each area, and selects one tracking error signal from the plurality of tracking control signals according to the counting results of said plurality of counting means.

19. A device according to claim 18, wherein said tracking control means controls the relative position between said reproducing means and the recording medium by using the tracking error signal indicative of the positional deviation between said reproducing means and the area which corresponds to a maximum one of the count results of said plurality of counting means.

20. A device according to claim 18, further comprising correcting means for correcting the error contained in the digital information reproduced by said reproducing means according to an output of said detecting means.

21. A device according to claim 17, wherein said forming means forms the plurality of tracking error signals using the reproduced digital information.

22. A device according to claim 17, wherein said forming means extracts a pilot signal component from the reproduced digital information and forms the plurality of tracking error signals.

23. A device according to claim 17, wherein the digital information is composed of a sync block having a sync data, ID data and information data.

24. A reproducing method comprising the steps of:
    reproducing digital information from a recording medium by a reproducing head, a plurality of tracks being formed on the recording medium, each track having a plurality of areas along the longitudinal direction of the track;

detecting an error in the reproduced digital information reproduced from the plurality of tracks, said detecting detecting the error of each of the plurality of areas of the track; and selecting one area from the plurality of areas of the track based on the error for each area detected in said detecting step and controlling a relative position between a target track of the recording medium and said reproducing head according to the selection result.

25. A method according to claim 24, wherein, in said controlling step, the relative position between the recording medium and the reproducing head is controlled so as to decrease the number of errors detected in said detecting step.

26. A method according to claim 24, wherein, in said controlling step, a tracking error signal indicative of a positional deviation between said at least one track on the recording medium and the reproducing head is formed by using a signal reproduced by the recording head, and the process of forming the tracking error signal is controlled according to the detection result.

27. A reproducing method comprising the steps of:

reproducing information from a recording medium by a reproducing head on which a plurality of tracks are formed, each track having a plurality of areas which are along the longitudinal direction of the track;

forming a plurality of tracking error signals indicative of positional deviations between said reproducing head and the plurality of areas of the track; and controlling a relative position between a target track of the recording medium and said reproducing head by selectively using the plurality of tracking error signals formed in said forming step.

28. A reproducing device comprising:

reproducing means for reproducing an information signal from a recording medium on which a plurality of tracks are formed, each track having a plurality of areas which are along the longitudinal direction of the track;

forming means for forming a tracking error signal indicative of positional deviations between said reproducing means and one area of the plurality of areas of the track;

tracking control means for controlling a relative position between a target track of the recording medium and said reproducing means according to the tracking error signal formed by said forming means; and changing means for changing the one area between the plurality of areas of the track.

29. A device according to claim 28, further comprising transporting means for transporting the recording medium in a direction crossing a longitudinal direction of each of the tracks, and wherein said reproducing means includes a rotating head and said tracking control means controls said transporting means.

30. A device according to claim 28, wherein the information signal is a digital information signal and the device further comprising detecting means for detecting errors in the digital information signal reproduced by said reproducing means.

31. A device according to claim 30, wherein said changing means changes the one area by using an output of said detecting means.

32. A device according to claim 31, wherein said changing means includes counting means for counting a number of errors detected by said detecting means.

33. A device according to claim 31, wherein said changing means changes the one area so that the errors in the digital information are most frequently occurred in the area.

34. A device according to claim 28, wherein said changing means changes the one area so that the tracking error between said reproducing means and the one area is larger than that between said reproducing means and another area.

35. A device according to claim 28, further comprising data detection means for detecting a digital signal from the reproduced signal and error detection means for detecting an error in the digital signal using error check code, said changing means changing the one area according to an output of said error detection means.

36. A tracking control device comprising:

input means for inputting a digital signal reproduced by reproducing means from a recording medium on which a plurality of tracks are formed, each track having a plurality of areas which are along the longitudinal direction of the track;

forming means for forming a tracking error signal indicative of positional deviations between said reproducing means and one area of the plurality of areas of the track;

tracking control means for controlling a relative position between a target track of the recording medium and said reproducing means according to the tracking error signal formed by said forming means; and changing means for changing the one area between the plurality of areas of the track.

37. A device according to claim 36, wherein said forming means forms the tracking error signal using the digital signal input by said input means.

38. A device according to claim 37, further comprising error detection means for detecting an error in the input digital signal, said changing means changing the one area of the tracking error signal according to an output of said error detection means.

39. A reproducing apparatus comprising:

reproducing means for reproducing a digital signal from a recording medium on which a plurality of tracks are formed, each track having a plurality of areas which are along the longitudinal direction of the track;

forming means for selecting one area of the plurality of areas of the track and for obtaining a tracking error signal indicative of a positional deviation between said reproducing means and the selected one area of the track using the digital signal reproduced from the selected one area of the track; and tracking control means for controlling a relative position between a target track and said reproducing means according to the tracking error signal obtained by said forming means.

40. An apparatus according to claim 39, wherein said forming means extracts a pilot signal component from the reproduced digital signal and forms the tracking error signals.

41. An apparatus according to claim 39, wherein the digital signal is composed of a plurality of sync blocks each of which has sync data and ID data.

42. An apparatus according to claim 41, wherein each of the plurality of areas includes a plurality of the sync blocks.

43. A reproducing apparatus comprising:

reproducing means for reproducing a digital signal reproduced by reproducing means from a recording medium on which a plurality of tracks are formed, each track having a plurality of areas which are along the longitudinal direction of the track;

forming means for forming a plurality of tracking error signals indicative of positional deviations between said reproducing means and the plurality of areas of the track;

tracking control means for controlling a relative position between a target track of the recording medium and said reproducing means according to the tracking error signals formed by said forming means, said tracking control means having a first mode in which said tracking control means controls the relative position according to a first tracking error signal indicative of the positional deviation between said reproducing means and a first area of the plurality of areas and a second mode in which said tracking control means controls the relative position according to a second tracking error signal indicative of the positional deviation between said reproducing means and a second area of the plurality of areas.

44. An apparatus according to claim 43, wherein said forming means extracts a pilot signal component from the reproduced digital signal and forms the tracking error signals.

45. An apparatus according to claim 43, wherein the digital signal is composed of a plurality of sync blocks each of which has sync data and ID data.

46. An apparatus according to claim 45, wherein each of the plurality of areas includes a plurality of the sync blocks.

* * * * *

UNITED STATES PATENT AND TRADEMARK OFFICE
CERTIFICATE OF CORRECTION

PATENT NO. : 6,181,506 B1 Page 1 of 1
APPLICATION NO. : 08/504251
DATED : January 30, 2001
INVENTOR(S) : Yukio Shumura et al.

It is certified that error appears in the above-identified patent and that said Letters Patent is hereby corrected as shown below:

Col. 9, line 30, delete "Vertical" and insert -- vertical --.
Col. 9, line 66, delete "Ti" and insert -- T1 --.
Col. 12, line 58, delete "claim 17" and insert -- claim 21 --.

Signed and Sealed this

Fifth Day of December, 2006

JON W. DUDAS
*Director of the United States Patent and Trademark Office*